(No Model.) 7 Sheets—Sheet 1.

W. H. KNIGHT & W. B. POTTER.
REGULATING APPARATUS FOR ELECTRICALLY DRIVEN MECHANISM.

No. 587,441. Patented Aug. 3, 1897.

WITNESSES—
A. F. Macdonald.
T. J. Johnston.

INVENTORS—
Walter H. Knight and
William B. Potter, by
Geo. H. Blodgett,
atty.

(No Model.) 7 Sheets—Sheet 2.

W. H. KNIGHT & W. B. POTTER.
REGULATING APPARATUS FOR ELECTRICALLY DRIVEN MECHANISM.

No. 587,441. Patented Aug. 3, 1897.

WITNESSES.
Alec H. Macdonald.
N. L. Hayes.

INVENTORS.
Walter H. Knight
William B. Potter
by Buckley & Blodgett
Attys (No Model.) 7 Sheets—Sheet 3.

W. H. KNIGHT & W. B. POTTER.
REGULATING APPARATUS FOR ELECTRICALLY DRIVEN MECHANISM.

No. 587,441. Patented Aug. 3, 1897.

Fig. 12.

Witnesses—
Alec F. Macdonald.
N. F. Hayes.

Inventors.
Walter H. Knight
William B. Potter
by
Bentley Blodgett
Atty (No Model.) 7 Sheets—Sheet 4.

W. H. KNIGHT & W. B. POTTER.
REGULATING APPARATUS FOR ELECTRICALLY DRIVEN MECHANISM.

No. 587,441. Patented Aug. 3, 1897.

(No Model.) 7 Sheets—Sheet 5.

W. H. KNIGHT & W. B. POTTER.
REGULATING APPARATUS FOR ELECTRICALLY DRIVEN MECHANISM.

No. 587,441. Patented Aug. 3, 1897.

Fig. 17.

UNITED STATES PATENT OFFICE.

WALTER H. KNIGHT, OF NEWTON, AND WILLIAM B. POTTER, OF LYNN, MASSACHUSETTS.

REGULATING APPARATUS FOR ELECTRICALLY-DRIVEN MECHANISM.

SPECIFICATION forming part of Letters Patent No. 587,441, dated August 3, 1897.

Application filed May 21, 1892. Serial No. 433,906. (No model.)

*To all whom it may concern:*

Be it known that we, WALTER H. KNIGHT, residing at Newton, in the county of Middlesex, and WILLIAM B. POTTER, residing at Lynn, in the county of Essex, State of Massachusetts, citizens of the United States, have invented certain new and useful Improvements in Regulating Apparatus for Electrically-Driven Mechanism, of which the following is a specification.

Our invention consists in certain apparatus by means of which two driving-motors may be changed from series to multiple connection, and in addition their action be still further modified by inserting a resistance when they are in series and reducing their field-magnet strength when they are in multiple.

The invention also consists in certain arrangements for adapting a regulator of this description to a street-car or vehicle of similar character.

Our invention is illustrated in the accompanying drawings, in which—

Figs. 18 to 25 show in detail the different combinations effected.

Figure 10:
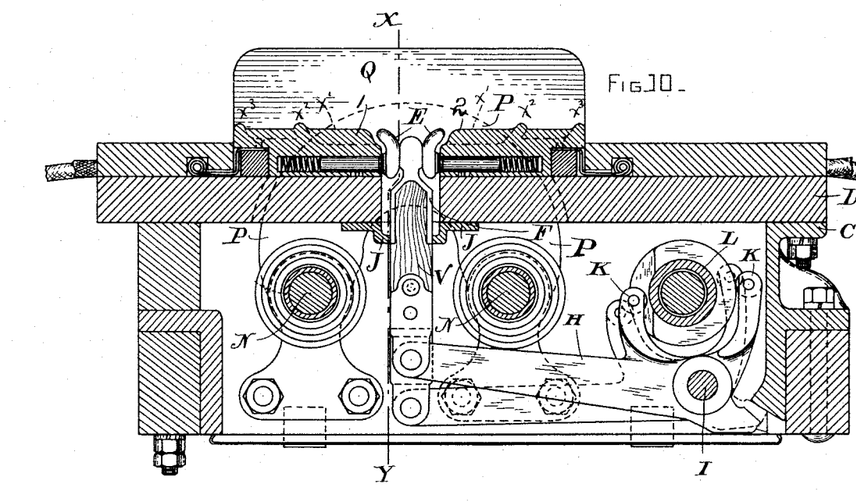
Fig. 10 is a transverse section through one pair of contact-plates.

Referring to Fig. 10, C is an inclosing box or case having a wooden cover D. Upon this cover are placed a series of contact-plates arranged in pairs, 1 2, 3 4, 5 6, 7 8, 9 10, 11 12, 13. These plates are arranged on opposite sides of a series of openings in the cover D. The inner ends of each pair of contact-plates are provided with spring-buffers E, which are adapted to receive between them and make electrical connection therewith a wedge-shaped tip F, Fig. 10, on the end of an upright wooden rod V.

Figure 12:
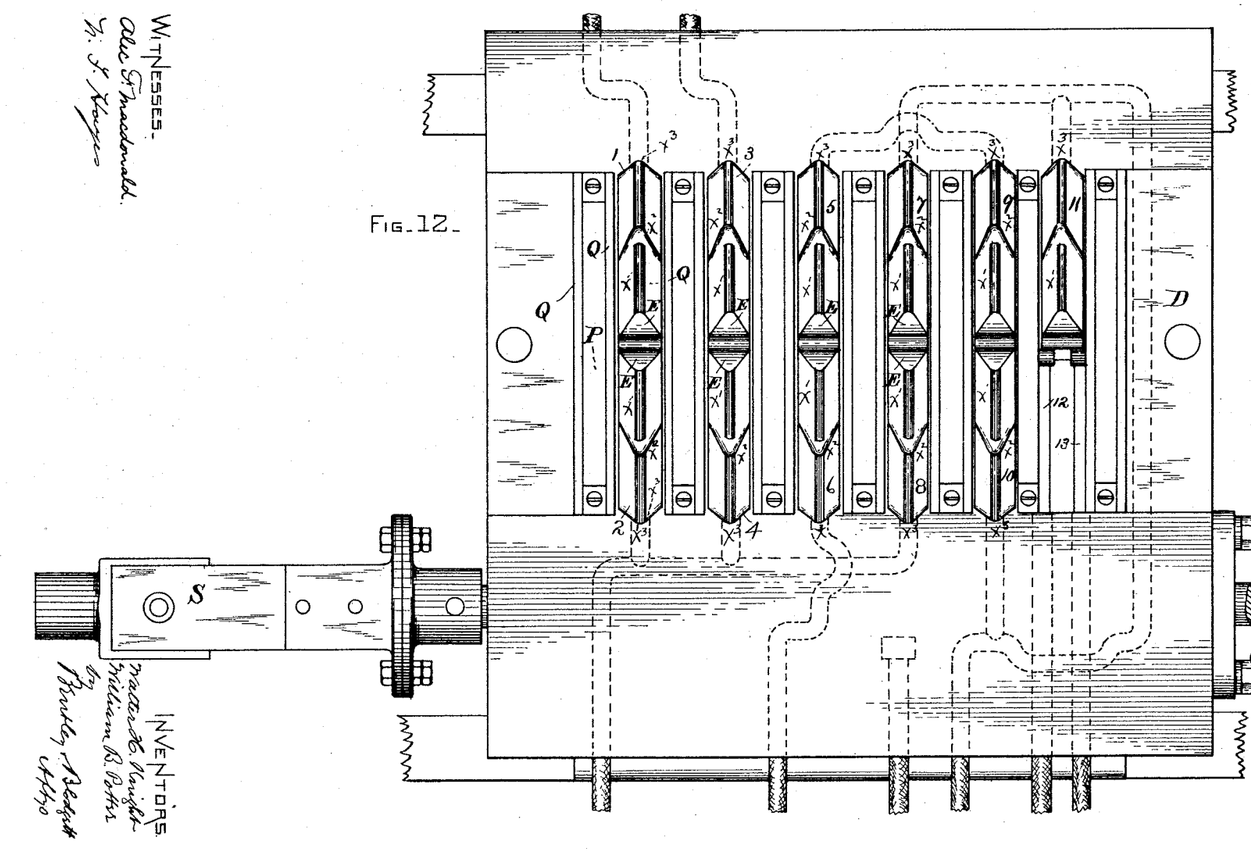
Fig. 12 is a plan of the apparatus in operative condition.
Figures 13, 14, 15, 16:
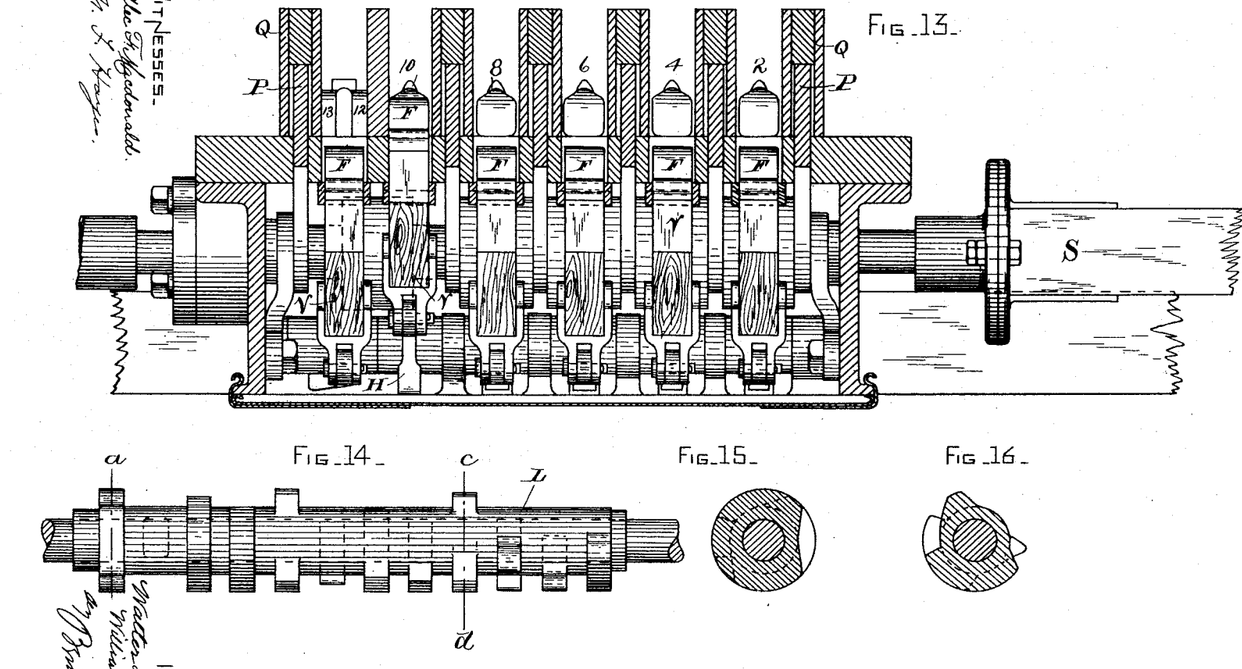
Fig. 13 is a longitudinal section on the line $xy$ of Fig. 10.
Figs. 14, 15, and 16 show the cam-cylinder in detail.

The spring-buffers of each pair of contact-plates normally rest opposite each other and out of contact, but are adapted to be put into good electrical connection when the tip F is forced up between them. The upper surfaces of the contact-plates are formed each with a longitudinal rib $x'$ and two transverse ribs, one transverse rib $x^3$ being at the outer extremity and the other $x^2$ in the middle of the contact-plate. The construction is best seen in Figs. 10, 12, and 13 of the drawings, in Fig. 10 the longitudinal dotted line in the upper part of the figure showing the surface of the contact-plates 1 2, &c., the plates being shown in plan in Fig. 12 and in section in Fig. 13. The object of these ribs will be explained hereinafter.

Figure 17:
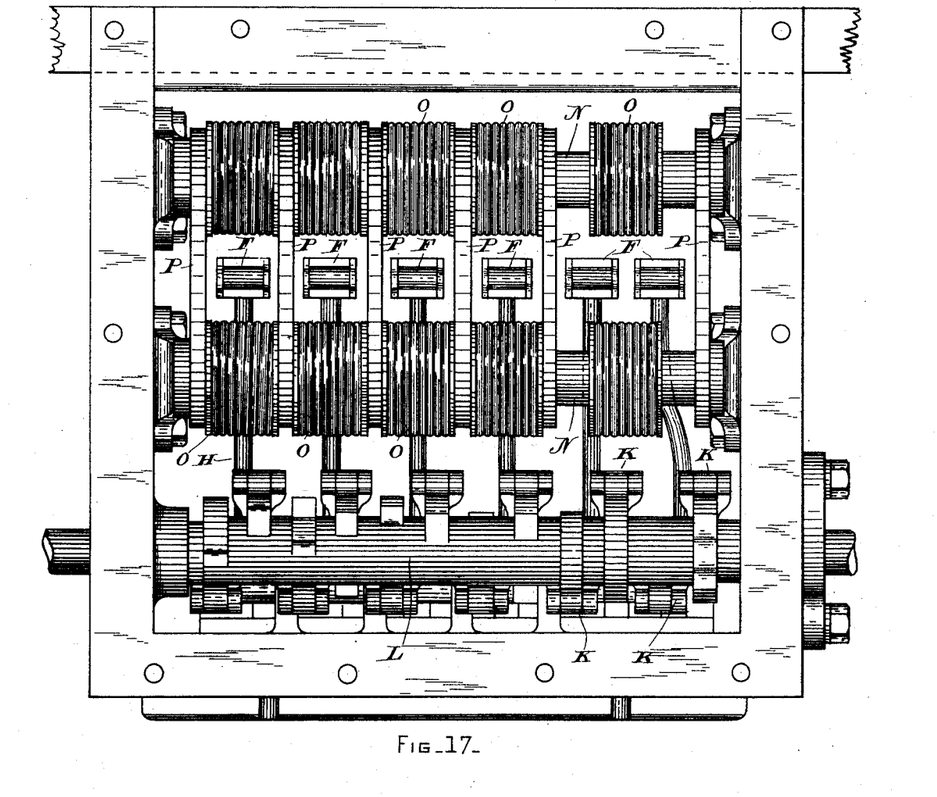
Fig. 17 is a plan of the switch inverted.

Within the casing C is arranged a series of levers H, Figs. 10, 13, and 17, having a common pivotal rod I and pivoted at their outer ends to the lower ends of the upright wooden rods V, respectively. Each lever H has two short arms K on opposite sides of the pivotal rod I, which have friction-rollers at their ends and embrace the cam-cylinder L, Figs. 10 and 17. This cam-cylinder is shown in detail in Figs. 14, 15, and 16, from which it will be seen that this cylinder has a series of twelve cams, two for each of the levers H, arranged at different points on the periphery, so that when it is turned these cams will bear successively on the arms K and actuate the levers H in a predetermined sequence. The result of this organization is to establish connection between the successive pairs of contact-plates 1 and 2, 3 and 4, &c., in any predetermined sequence, the connection being maintained for a predetermined length of time between the plates of each pair and finally interrupted at a predetermined period. In order that any arc formed between the contact-plates of any pair on the interruption of the circuit may be ruptured, we provide a common blow-out magnet for each of the different sets of contact-plates. This is best illustrated in Figs. 10 and 17.

Two iron rods N are extended on opposite sides of the series of rods V and are wound with a series of coils O. The successive coils are wound in opposite directions, so that consequent poles are established in the cores N at the points between the coils. At these consequent polar points are attached arched polar extensions P, reaching from one core to the other and of the form indicated in Fig. 10. These polar extensions reach through the cover of the casing, so that each set of contact-plates is embraced by a pair of polar extensions, as indicated in Figs. 12 and 13. The opposite faces of these polar extensions are covered with fiber plates Q.

The object of the rib formation on the surface of the contact-plates may now be described. Whenever an arc is formed between any two of the spring-buffers E on the withdrawal of the tip the effect of the magnetic poles on either side is to force the arc along the longitudinal ribs $x'$ on the two contact-plates until, if it is very powerful, it reaches the outer rib $x^3$ at the extremities of the two plates and is there broken. If it is less powerful, it only reaches the intermediate transverse ribs $x^2$, and is broken there, but in any event it is forced from the spring-buffers E along the longitudinal ribs, and any fusing or burning action by the arc must take place on these ribs, where it can result in no injury. In practice it is found that the arc is instantly ruptured and there is substantially no fusing even of the ribs.

Figure 11:
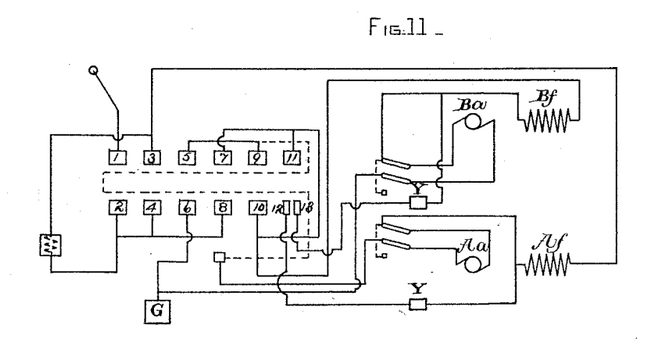
Fig. 11 is a diagram of the permanent electrical connections.
Figure 26:
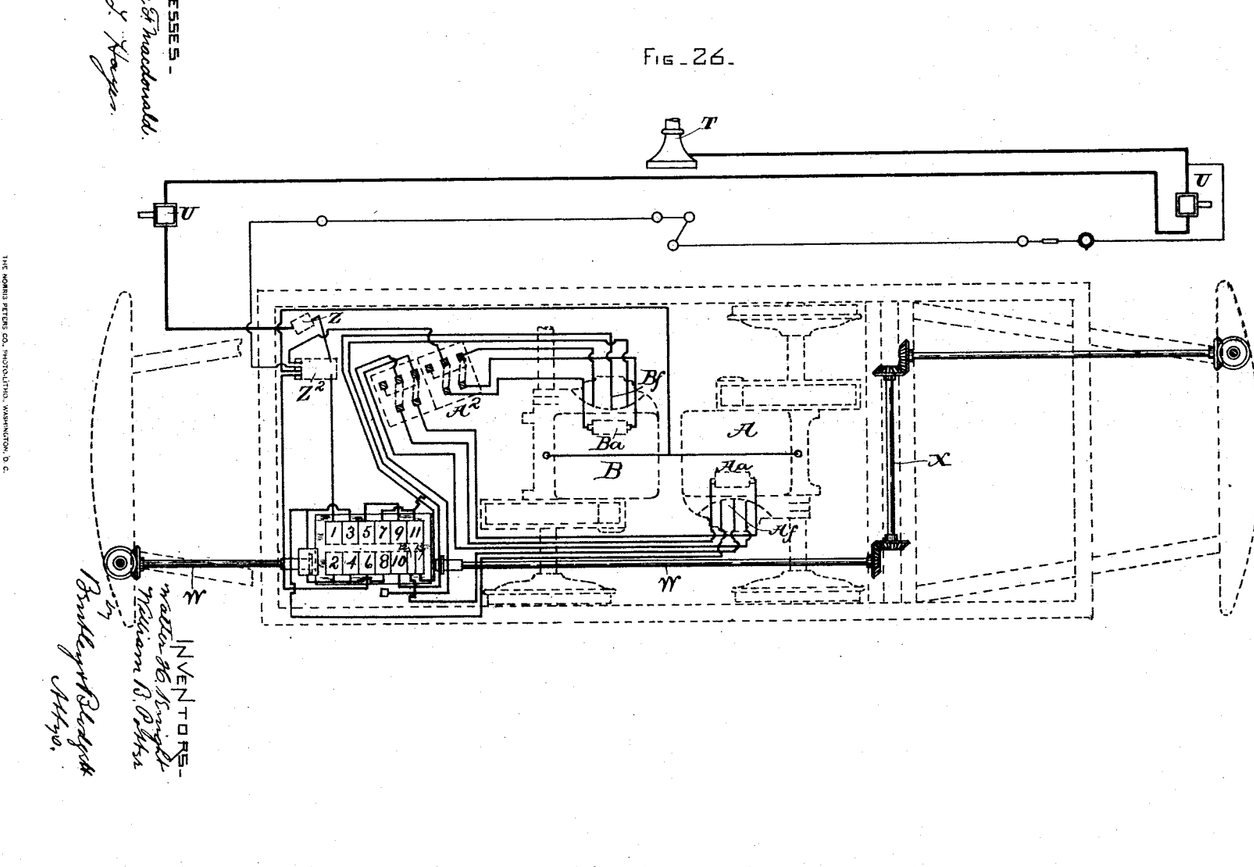
Fig. 26 shows in diagram the method of applying the apparatus to an electric street-car.

Electrical connection with the different sets of contact-plates may be established in any desired manner. A diagram of these connections is given in Fig. 11, while in Fig. 12 the actual positions of the connections within the switch-box are indicated by the dotted lines, and in Fig. 26 a diagram of the switch-box relative to the two motors and the car-body is given. In Fig. 26 one of the convenient locations on a street-car for a switch-box such as ours is indicated. The switch is operated by means of a shaft extending in opposite directions from the cam-cylinder L and connected thereto by means of insulating-joints S. This shaft W extends longitudinally along the car and terminates at each end in a bevel-pinion. One of these pinions engages directly with a similar pinion on the lower end of a spindle on the platform, while the other pinion engages in a similar manner with a corresponding spindle on the other platform by the intervention of a transverse shaft X.

Figure 1:
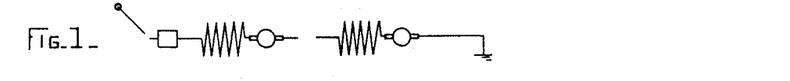
Figures 1 to 9, inclusive, illustrate the different combinations of circuits effected by our apparatus.
Figure 2:
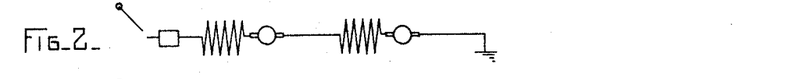
Figure 3:
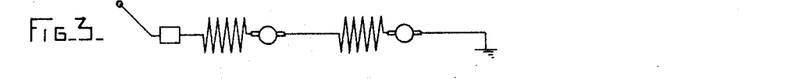
Figure 4:
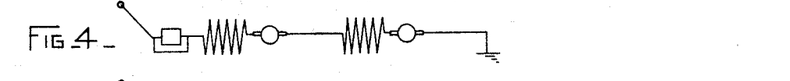
Figure 5:
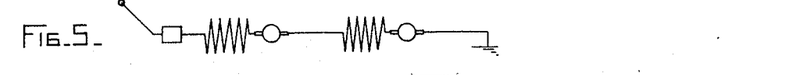
Figure 6:
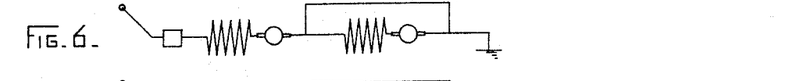
Figure 7:
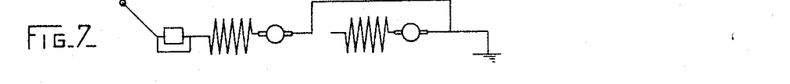
Figure 8:
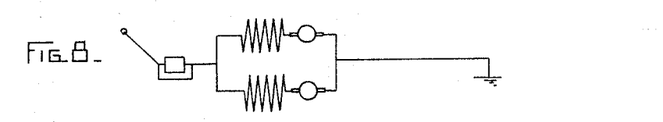
Figure 9:
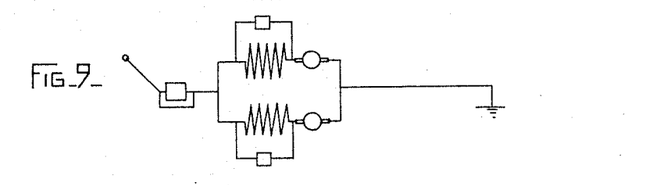
Figure 18:
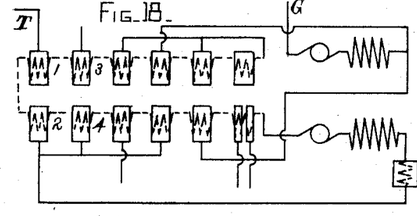
Figure 19:
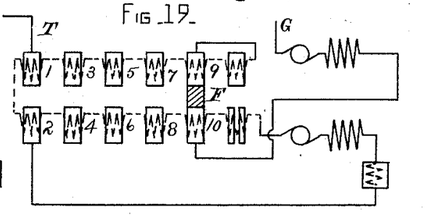
Figure 20:
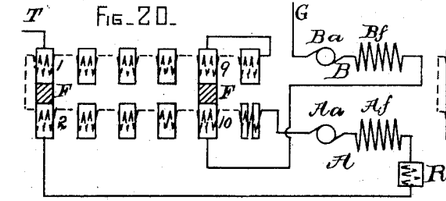
Figure 21:
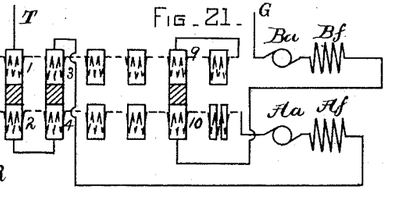
Figure 22:
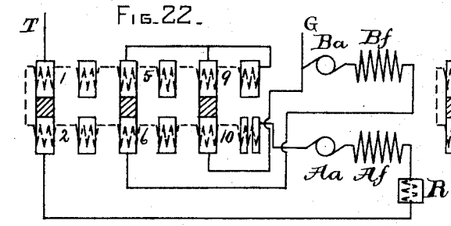
Figure 23:
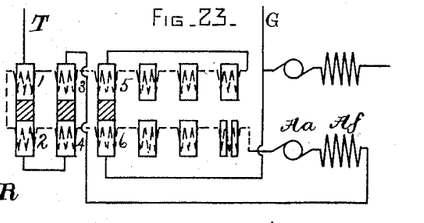
Figure 24:
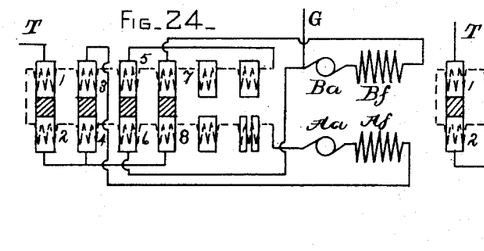

A and B are the two motors, their armatures and fields being respectively indicated by $A^a$ $A^f$ and $B^a$ $B^f$. The successive combinations of circuits effected by our switch are indicated in Figs. 18 to 25, in which the different pairs of contact-plates that are connected by the successive steps of the operation are indicated. By tracing the circuit in each of these different figures, referring, if necessary, to the plan of permanent connections in Fig. 11, it will be apparent that the connections which are established are those indicated in outline in Figs. 1 to 9. In these figures, T is the trolley or entering terminal, and G is the ground. In Fig. 1, which corresponds to the zero position of the switch, the circuit is interrupted at two points. In Fig. 2 it is still interrupted, but at only one point. In Fig. 3 the two motors are in series with each other and with the resistance R. In Fig. 4 the motors are in series, with the resistance cut out. In Figs. 5 and 6 the resistance is first cut in, and then one motor is shunted, the other motor being left in series with the resistance only. In Figs. 7 and 8 one terminal of the motor B is disconnected from the circuit and reconnected to the corresponding terminal of the other motor, so that the two are in multiple while the resistance is cut out. In Fig. 9 the two motors are still in multiple, with the resistance cut out, and a shunt-circuit established around each of their fields. This will appear more clearly on referring in detail to Figs. 18 to 25. In Fig. 18 all the tips F are down, and there is no connection between the two plates of any of the pairs of contact-plates. In Fig. 19 one tip F is thrown up, connecting plates 9 and 10; but still the circuit is not complete. In Fig. 20 plates 1 and 2 and 9 and 10 are connected, and the circuit is as follows: trolley T, plates 1 and 2, resistance R, motor A, blow-out magnet, (the circuit of this is indicated by the dotted line,) plates 9 and 10, motor B, ground G. In Fig. 21 plates 1 and 2, 3 and 4, and 9 and 10 are connected, and the circuit is as follows: plates 1 and 2, plates 4 and 3, motor A, blow-out magnet, plates 9 and 10, motor B, and ground G. In Fig. 22 plates 1 and 2, 5 and 6, and 9 and 10 are connected, and the circuit is as follows: trolley T, plates 1 and 2, resistance R, motor A, blow-out magnet, plates 5 and 6, and ground G, the motor B being shunted by a line from the blow-out magnet to plates 9 and 10, motor B, and ground G. In Fig. 23 plates 1 and 2, 3 and 4, and 5 and 6 are connected, the circuit being trolley T, plates 1 and 2, plates 4 and 3, motor A, blow-out magnet, plates 5 and 6, and ground G. In Fig. 24 plates 1 and 2, 3 and 4, 5 and 6, and 7 and 8 are connected, the circuit being trolley T, plates 1 and 2, branching at plate 4, one branch being plates 4 and 3, motor A, blow-out magnet, plates 5 and 6, and ground G, the other branch being plate 4, plates 8 and 7, motor B, and ground G. In Fig. 25 plates 1 and 2, 3 and 4, 5 and 6, 7 and 8, and 11, 12, and 13 are connected, and the circuit is trolley T, plates 1 and 2, branching at plate 4 through the two motors in the same manner as in Fig. 24, but two sub-branches are established, shunting the field-magnets of each motor from plate 11, through plates 12 and 13, respectively, as follows: plate 12, resistance Y, armature $A^a$, shunting the field $A^f$; the other, plate 13, resistance Y, armature $B^a$, shunting the field $B^f$. In the combination shown in Fig. 25 a further rotation of the cam-cylinder would restore the parts to their normal condition, or the cylinder may be rotated backward and the order of the connections reversed, the latter method being preferable. In Fig. 26, wherein a car-wiring is indicated, T is a trolley from which the main line passes through the circuit-breakers U, thence through the fuse-box Z and lightning-arrester Z² to the switch-box, whence it passes in the manner described through the two motors A and B, each of which is provided with a separate reversing-switch A² for its armature-circuit.

What we claim as new, and desire to secure by Letters Patent, is—

1. In an apparatus for regulating the power and speed of mechanism driven by two electric motors, the combination of two electric motors, and a switch connecting them in series with each other and with a resistance, the switch provided with contacts and connections arranged to shunt one motor, leaving the other in series with a resistance, to disconnect one motor and to connect the two motors in multiple, all by successive steps.

2. In an apparatus for regulating the power and speed of mechanism driven by two electric motors, the combination of two motors, and a switch for placing them in series with each other and with a resistance, the switch provided with contacts and connections adapted to cut out the resistance, for one rate of speed, to again cut in the resistance, to shunt one motor, to disconnect one motor and cut out the resistance, and to connect the two motors in multiple.

3. In an apparatus for regulating the power and speed of mechanism driven by two electric motors, the combination of two electric motors in series with each other and with a resistance, with a switch provided with contacts and connections adapted to cut out the resistance, to shunt one motor, leaving the other in circuit with the resistance to disconnect one motor, to connect the two motors in multiple, and to open or close a circuit changing the field-magnet strength of the motors.

4. In an apparatus for regulating the power and speed of mechanism driven by two electric motors, the combination of two motors in series with a switch provided with contacts and connections adapted to insert a resistance, to shunt one motor leaving the other in circuit with the resistance, and to connect the motors in multiple.

5. In an apparatus for regulating the power and speed of mechanism driven by two electric motors, the combination with two motors in series with each other and with a resistance, of a switch provided with contacts and connections adapted to shunt motor while a resistance is included in the circuit, and to connect the motors in multiple.

6. In an apparatus for regulating the power and speed of mechanism driven by two electric motors, the combination of two motors in series with a switch adapted to insert a resistance, to shunt one motor leaving the other motor in series with the resistance, to disconnect one motor and to connect the two motors in multiple.

7. In an apparatus for regulating the power and speed of mechanism driven by two electric motors, the combination of a resistance and two motors arranged in series, with a switch provided with contacts and connections adapted to shunt one motor leaving the other motor in circuit with the resistance, and to connect them both in multiple.

8. In an apparatus for regulating the power and speed of mechanism driven by two electric motors, the combination of a resistance, two electric motors, and a switch adapted to throw them into series or multiple relation, the switch provided with contacts and connections for including the resistance in series and for shunting the field-magnets of the motors to a greater or less extent.

9. In an electrically-driven mechanism the combination with two motors of a switch placing the motors successively in series and multiple arc, and magnetic pole-pieces placed adjacent to the several contact-plates of the switch whereby the different combinations of circuits may be perfected without injury to the switch.

10. In a regulator for electrically-driven mechanism the combination with two motors, of a switch for placing the motors successively in series and multiple, magnetic pole-pieces adjacent to the several contact-plates of the switch, and a common magnetic core for energizing the said pole-pieces.

11. In a regulator for electrically-driven mechanism the combination with two motors, of a switch for placing the motors successively in series and multiple, the several contact-points of the said switch being provided respectively with a separate magnetic field acting to rupture any arc that may be formed thereat.

12. The combination with an electric switch having a series of points at which the circuit is to be interrupted, of a series of pole-pieces adjacent to the said points respectively, whereby a separate magnetic field may be produced at each point.

13. In a regulator for electrically-driven mechanism the combination with two motors of a switch for connecting them successively in series and multiple, the switch having a series of pairs of contact-plates, the two plates of each pair being respectively provided with a movable insulated connecting-piece by which the circuit is completed or broken through the different pairs respectively.

14. In a switch for making a series of electrical connections the combination with a series of pairs of contact-plates, of a corresponding series of insulated connecting-pieces adapted to connect the two plates of each pair respectively, and magnetic pole-pieces adjacent to the several points of contact between the two plates of each pair.

15. In a switch for making a series of electrical connections the combination with a series of contact-plates of a series of intermediate magnetic pole-pieces, succeeding pole-pieces being of opposite polarity and placed adjacent to the several points at which the circuit is to be interrupted.

16. In an electric circuit-breaker the combination with two contact-plates of an intermediate, movable, insulated connecting-piece, with means for maintaining a magnetic field adjacent to the space separating the two plates.

17. In a regulating-switch the combination of a series of contact-levers with a common actuating device adapted to move the said levers positively in both directions in a predetermined order to establish a series of electrical connections.

18. In a regulator for electrically-propelled mechanism, the combination with two motors of a switch for connecting the motors in series or multiple, said switch consisting of a series of contact-levers provided with a common actuating device for moving the levers in a predetermined order to establish the desired electrical connections.

19. In a regulator for electrically-driven mechanism the combination with two motors of a switch to connect the two motors in series or multiple, consisting of a series of pairs of contact-plates, a corresponding series of movable connecting-pieces, one for each of the pairs of plates, and means for actuating the said pieces in a predetermined order to establish the desired electrical connections.

20. In a regulator for electrically-driven mechanism the combination with two motors of a switch for connecting the motors in series or multiple, consisting of a series of contact-plates connected to the motor-terminals, a corresponding series of insulated connecting-pieces with a common actuating device, composed of a series of cams differently placed on a common shaft, so as to engage with and actuate the said pieces in a predetermined order.

WALTER H. KNIGHT.
WILLIAM B. POTTER.

Witnesses:
JOHN W. GIBBONEY,
BENJAMIN B. HULL.